United States Patent [19]

Claussen et al.

[11] Patent Number: 4,863,634

[45] Date of Patent: Sep. 5, 1989

[54] ANTHRAQUINONE DYESTUFFS

[75] Inventors: Uwe Claussen; Rütger Neeff, both of Leverkusen; Friedrich W. Kröck, Odenthal, all of Fed. Rep. of Germany

[73] Assignee: Bayer Aktiengesellschaft, Leverkusen, Fed. Rep. of Germany

[21] Appl. No.: 616,082

[22] Filed: Jun. 1, 1984

Related U.S. Application Data

[63] Continuation of Ser. No. 414,166, Sep. 2, 1982, abandoned.

[30] Foreign Application Priority Data

Sep. 18, 1981 [DE] Fed. Rep. of Germany ....... 3137298

[51] Int. Cl.$^4$ .................. C09K 19/00; C09B 1/20
[52] U.S. Cl. .................. 252/299.1; 350/349; 260/371; 260/372; 260/373; 260/376; 260/377; 260/378; 260/380; 260/381
[58] Field of Search ............. 252/299.1; 250/289; 260/371, 372, 373, 377, 380, 376, 368, 381

[56] References Cited

U.S. PATENT DOCUMENTS

| | | |
|---|---|---|
| 4,232,950 | 11/1980 | Denham ................. 252/299.1 |
| 4,360,447 | 11/1982 | Morinaka et al. ........ 252/299.1 |
| 4,363,743 | 12/1982 | Moeller et al. ......... 252/299.1 |
| 4,428,858 | 1/1984 | Cognard et al. ........ 252/299.1 |
| 4,495,083 | 1/1985 | Imazeki et al. ......... 252/299.1 |
| 4,505,549 | 2/1985 | Shimidzu et al. ....... 252/299.1 |
| 4,532,069 | 7/1985 | Scherowsky et al. .... 252/299.1 |
| 4,585,574 | 4/1986 | Blynck ................. 252/299.1 |
| 4,588,517 | 5/1986 | Kaneko et al. ......... 252/299.1 |
| 4,596,666 | 6/1986 | Blunck et al. .......... 252/299.1 |
| 4,689,171 | 8/1987 | Blunck et al. .......... 252/299.1 |

FOREIGN PATENT DOCUMENTS

| | | | |
|---|---|---|---|
| 25809 | 4/1981 | European Pat. Off. ......... 252/299.1 |
| 26004 | 4/1981 | European Pat. Off. ......... 252/299.1 |
| 38460 | 10/1981 | European Pat. Off. ......... 252/299.1 |
| 54217 | 6/1982 | European Pat. Off. ......... 252/299.1 |
| 93367 | 11/1983 | European Pat. Off. ......... 252/299.1 |
| 2019427 | 11/1971 | Fed. Rep. of Germany ... 252/299.1 |
| 2920730 | 11/1979 | Fed. Rep. of Germany ... 252/299.1 |
| 16-3515 | 3/1941 | Japan ..................... 252/299.1 |
| 57-198776 | 12/1982 | Japan ..................... 252/299.1 |
| 973262 | 10/1964 | United Kingdom ......... 252/299.1 |
| 2037803 | 7/1980 | United Kingdom ......... 252/299.1 |

OTHER PUBLICATIONS

Cognard, J., et al., Mol. Cryst. Liq. Cryst., vol. 70, pp. 1-19 (1981).

Primary Examiner—Teddy S. Gron

Attorney, Agent, or Firm—Sprung, Horn, Kramer & Woods

[57] ABSTRACT

Dyestuffs of the formula

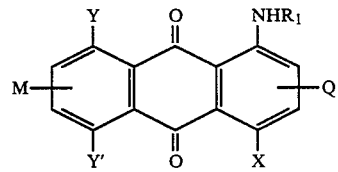

I in which
X designates $OR_2$ or a group $NHR_2$,
Y designates H or a group $NHR_2$ or $OR_2$,
Y' designates H or $NHR_1$,
$R_1$ and $R_2$ designate H, alkyl, cycloalkyl, aryl or aralkyl and if Y or Y' represents H,
Q designates aryl, a thienyl radical or a group $—OR_2$, $—NHR_3$, $—SO_2R_3$, $—S—CO—R_3$, $—CO—SR_3$, $—SR_3$, $—CH=NR_3$, $—COOR_3$, $—OCOR_3$, $—OCOOR_3$, $—NHCO—OR_3$, $—O—SO_2—R_3$, $—NH—CO—NHR_3$, $—O—CO—NHR_3$, $—CHO$, $—O—CH_2CH_2—OR_3$ or $—SO_3R_3$,
M designates H, halogen or Q,
$R_3$ designates alkyl, aralkyl, cycloalkyl or a heterocyclic radical or a radical Z of the formula

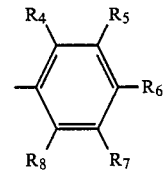

wherein
$R_4$ and $R_8$ denote H, halogen, $CF_3$, alkyl or alkoxy and
$R_5$ and $R_6$ denote $R_4$, $—SR_3$, $—NO_2$, $—OR_3$, $—CO_2R_3$, $—COR_3$, $—SCOR_3$, $—SO_3R_3$, $—NHCONHR_3$, $—OCONHR_3$, $—OSO_2R_3$, $—NH—CO—O—R_3$, $—OCOR_3$, $—(CH_2)_2CN$, aryl, aralkyl, cycloalkyl or a heterocyclic radical and
$R_7$ denotes H, alkoxy or alkyl, and if Y represents $NHR_2$ or $OR_2$ and Y' represents $NHR_1$,
M represents Q and
Q denotes a radical $—L—Z$.
L denoting an O or S atom or a group $—NR_1—$, and liquid-crystalline material containing at least one of these dyestuffs.

5 Claims, No Drawings

ANTHRAQUINONE DYESTUFFS

This is a continuation of application Ser. No. 414,166, filed Sept. 2, 1982, now abandoned.

The invention relates to anthraquinone dyestuffs of the formula I, a process for their preparation and their use in dyeing and to liquid-crystalline material containing these anthraquinone dyestuffs.

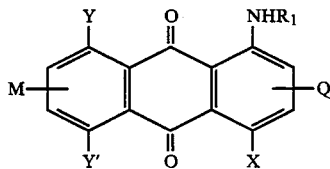

In the formula I,
X denotes $OR_2$ or a group $NHR_2$,
Y denotes H or a group $NHR_2$ or $OR_2$,
Y' denotes H or $NHR_1$,
$R_1$ and $R_2$ denote H, alkyl, cycloalkyl, aryl or aralkyl and if Y or Y' represents H,
Q denotes aryl, a thienyl radical or a group $-OR_3$, $-NHR_3$, $-SR_3$, $-SO_2R_3$, $-S-CO-R_3$, $-CO-SR_3$, $-CH=NR_3$, $-COOR_3$, $-OCOR_3$, $-OCOOR_3$, $-O-SO_2-R_3$, $-NH-CO-OR_3$, $-NR-CO-NHR_3$, $-O-CO-NHR_3$, $-CHO$, $-O-CH_2CH_2-OR_3$ or $-SO_3R_3$,
M denotes H, halogen or Q,
$R_3$ denotes alkyl, aralkyl, cycloalkyl or a heterocyclic radical or a radical Z of the formula

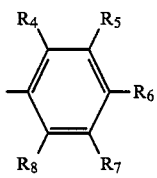

wherein
$R_4$ and $R_8$ denote H, halogen, $CF_3$, alkyl or alkoxy and
$R_5$ and $R_6$ denote $R_4$, $-SR_3$, $-NO_2$, $-OR_3$, $-CO_2R_3$, $-COR_3$, $-SCOR_3$, $-SO_3R_3$, $-NH-CONHR_3$, $-OCONHR_3$, $-OSO_2R_3$, $-NH-CO-O-R_3$, $-OCOR_3$, $-(CH_2)_2CN$, aryl, aralkyl, cycloalkyl or a heterocyclic radical and
$R_7$ denotes H, alkoxy or alkyl, and if Y represents $NHR_2$ or $OR_2$ and Y' represents $NHR_1$,
M represents Q and
Q denotes a radical $-L-Z$,
L denoting an O or S atom or a group $-NHR_1-$, and the alkyl, cycloalkyl, aryl, aralkyl, alkoxy or heterocyclic radicals mentioned for $R_1$, $R_2$, $R_3$, $R_4$, $R_5$, $R_6$, $R_7$, $R_8$ and Q can be substituted.

A preferable group is formed by dyestuffs of the formulae

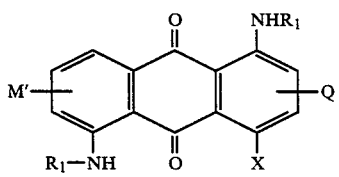

and

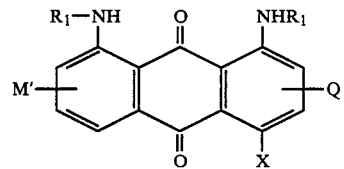

in which
Q, $R_1$ and X have the meanings indicated for the formula I and
M' represents H, halogen, $-NHR_3$, $-OR_3$, $-SR_3$, $-CH=NR_3$, $-COOR_3$, $-O-SO_2R_3$, $-OCOR_3$ or $-SO_3R_3$ with the meaning for $R_3$ as indicated for the formula I.

Another preferable group is formed by compounds of the formula

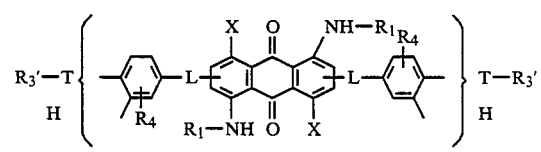

In the formula III,
$R_3'$ denotes $C_1$-$C_{12}$-alkyl which is bonded directly to T or via

$-O-$ or $-S-$ and which can be substituted, for example by $-OH$, $-OCH_3$, halogen or $-SCH_3$; $C_5$-$C_6$-cycloalkyl, benzyl or phenethyl, and the phenyl radicals in the aralkyl radicals can be substituted, for example by $-OH$, $C_1$-$C_4$-alkoxy, $C_1$-$C_4$-alkylthio, phenoxy, phenylthio, $C_1$-$C_4$-alkyl or halogen;
T denotes a group $-O-C(L)-$, $-NR_1-C(L)-$, $-C(L)-$, $-O-SO_2-$ or $-SO_2-$ and
X, L, $R_1$ and $R_4$ have the meaning indicated for the formula I.

$R_1$, $R_2$, $R_3$, $R_4$, $R_7$ and $R_8$, in the meaning of alkyl, preferably represent $C_1$-$C_8$-alkyl which can be substituted, for example by $C_1$-$C_6$-alkoxy, $C_1$-$C_6$-alkylthio, phenoxy, phenylthio, Cl, Br, F, $-NH_2$, $-SH$, $-OH$ or $-CN$.

$R_1$, $R_2$, $R_5$ and $R_6$, in the meaning of cycloalkyl, preferably represent $C_3$-$C_7$-cycloalkyl, particularly preferably cyclohexyl or cyclopentyl, which can be substituted, for example by $C_1$-$C_6$-alkyl, $C_1$-$C_6$-alkoxy, phenoxy, Cl, Br, F, $-NH_2$, $-SH$, $-OH$ or $-CN$.

$R_1$, $R_2R_5$, $R_6$ and Q, in the meaning of aryl, preferably represent phenyl, naphthyl or biphenylyl, which can be substituted, for example by $C_1$-$C_6$-alkoxy, $C_1$-$C_6$-alkyl, phenoxy or F, Cl, Br, $C_1$-$C_6$-alkylthio, phenylthio or $-OH$.

$R_1$, $R_2$, $R_3$, $R_5$ and $R_6$, in the meaning of aralkyl, preferably represent phenyl-$C_1$-$C_4$-alkyl which, in the phenyl radical, can carry, for example, the substituents mentioned above for aryl.

$R_4$, $R_7$ and $R_8$, in the meaning of alkoxy preferably designate $C_1$-$C_8$-alkoxy.

M, $R_4$ and $R_8$, in the meaning of halogen, preferably represent fluorine, chlorine or bromine.

The new dyestuffs are characterised by excellent light fastness and by a high order parameter and, to a predominant extent, by a solubility in liquid-crystalline materials which is adequate for industrial use. The properties mentioned are of critical importance for suitability as dyestuffs in electro-optical display elements which work according to the guest-host principle (German Offenlegungsschrift No. 3,028,593).

Electro-optical display elements consist as a rule of 2 glass plates arranged in parallel fashion (a distance of 5–50μ apart). Electrodes, between which the liquid-crystalline material is embedded, are located on the inward-facing sides of the glass plates. The working principle of an electro-optical display rests on the orientated structure of the liquid crystals, which structure can be altered by the applied electric field.

The orientated structure of the liquid-crystalline materials can communicate itself to suitable dyestuffs, so that the latter take part in the structure as "guests".

The dyestuffs according to the invention produce blue, violet and red-tinged blue hues. They are used in guest-host displays, the structure and mode of working of which is known (Heilmeyer et al., Mol. Crystals and Liquid Cryst. 8, 293–309 (1969), German Offenlegungsschrift No. 2,639,675, German Offenlegungsschrift No. 2,658,568), as a solution in a nematic liquid crystal mixture. The liquid-crystalline material as host phase contains at least one dyestuff of the formula I and can additionally contain further dyestuffs. The latter can or cannot have dichroic properties. The solution preferably contains about 0.01 to about 30% by weight, particularly preferably about 0.1 to about 10% by weight, of dyestuff (as guest), and the host phase consists predominantly of nematic liquid-crystalline material and can contain further additives, for example to obtain cholesteric orientation.

The new dyestuffs are also suitable for dyeing textile materials, preferably based on polyester, or for mass-colouring plastics, such as, for example polystyrene, polyvinyl chloride, polycarbonate and the like. However, they are preferably used in liquid-crystalline materials. The invention therefore also relates to liquid-crystalline materials which contain anthraquinone dyestuffs of the formula (I). The liquid-crystalline material preferably has positive dielectric anisotropy and can be used in electro-optical display devices. Of the various states of orientation of liquid-crystalline materials, the nematic and cholesteric states are preferable, according to the definitions given, for example, in R. Steinsträsser and L. Pohl, Angew. Chem. 85, 706 (1973).

In the absence of a field, it is possible to distinguish two orientations of the liquid-crystalline material which depend on the properly of the phase boundary and hence on the pretreatment of the glass plates. According to whether the long axes of the molecules, which make up the liquid-crystalline phase, are orientated vertically or horizontally to the plate surface, one speaks of homoeotropic or homogeneous texture. The preparation techniques for producing suitable surfaces are known (Ullmann, 4th Edition (1976), Volume XI, page 657 et seq.). The sign of the dielectric anisotropy depends on the dipole properties of the liquid-crystalline compounds. The anisotropy is positive when the electric field effects a homoeotropic alignment, and it is negative when the alignment becomes homogeneous. The use of the dyestuffs according to the invention in liquid-crystalline materials having positive dielectric anisotropy and a mesophase range from $-20°$-$+80°$ C. is preferable. Examples of suitable liquid-crystalline materials are mixtures of alkylcyanobiphenylene, alkoxycyanobiphenylene, alkylcyanoterphenylene, phenylcyclohexanes, bicyclohexylene, azoxy compounds, Schiff bases, phenyl benzoates, phenyl thiobenzoates and terpyrimidines. To be emphasised in particular are a mixture of 51% of 4'-n-pentyl-4-cyanobiphenyl, 25% of 4'-n-heptyl-4-cyanobiphenyl, 16% of 4'-n-octyl-4-cyanobiphenyl and 8% of 4''-n-pentyl-4-cyanoterphenyl and a mixture of about 24% of trans-4-heptyl-(4-cyanophenyl)-cyclohexane, 37% of trans-4-pentyl-(4-cyanophenyl)-cyclohexane, 26% of trans-4-propyl-(4-cyanophenyl)-cyclohexane and 12% of trans-4-pentyl-(4'-cyanobiphenylyl)-cyclohexane. The liquid-crystalline material can contain, in addition to the liquid-crystalline compounds and the dyestuff, further customary additives, for example optically active compounds which can transform a nematic phase into a cholesteric phase or substances for lowering the threshold voltage and the like.

Examples which would have to be mentioned of commercial and suitable liquid crystal materials are, for positive dielectric anisotropy, the products "Ro-TN-403", "Ro-TN-103", "Merck ZLI 1221", "Merck TLC 1132" and "Merck ZLI 1291". Examples of nematic liquid crystal materials having negative dielectric anisotropy are "Merck-Licristal 914" and "Chisso Lixon En-18".

The quality of the guest-host interaction can be indicated by the mean deviation of the geometric axes of the dyestuff molecules from the preference direction given by the molecules of the liquid-crystalline material. It is possible to define an order parameter S which takes into account the mean deviation and assumes the value 1.0 on perfect orientation. In practice this value is not obtained, the S values being <1.0. The definition of the order parameter and its meaning is described in D. L. White and G. N. Taylor, J. Appl. Phys. (5), 4718–23 (1974) or, for example, in European Laid-Open Application 2,104.

Dyestuffs having a high order parameter are particularly valuable for industrial use. However, a number of other properties must be present. Photochemical stability must be very good, and, in light, the shade must neither discolour nor fade. In addition, good chemical stability is required in the liquid-crystalline medium which has a complex composition. Finally, the dyestuff must be readily soluble and must not crystalline even at prolonged low temperatures.

It is obvious that there are not many materials which satisfactorily fulfill all the properties in their entirety. A necessary prerequisite for the utilisability of the dyestuffs is dichroism of light absorption as a function of the orientation of the host liquid crystals.

It represents a particular difficulty to make the dyestuffs sufficiently soluble while retaining the dichroic fastness and colour properties. Particularly to optimise the solubility, numerous experiments are necessary, and this property can only be predicted with difficulty and imperfectly. It is a general experience that the solubility decreases with increasing degree of substitution, while the order parameter is improved, for example, by elaborate substitution.

It was therefore very surprising that, in particular, compounds of the formula IV combine excellent dichroic and dyestuff properties with ready solubility.

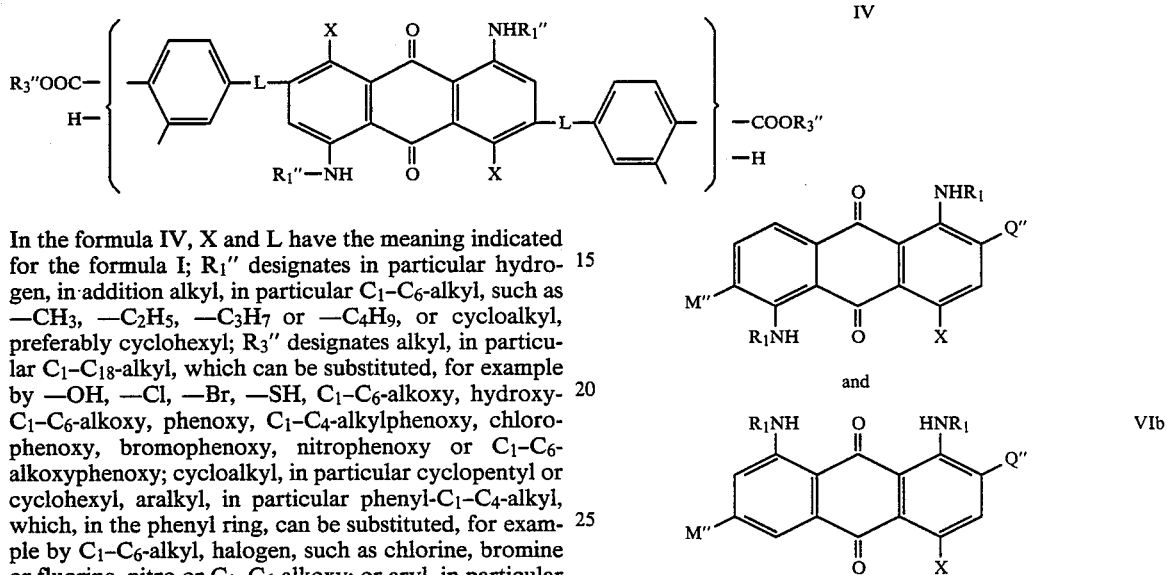

In the formula IV, X and L have the meaning indicated for the formula I; $R_1''$ designates in particular hydrogen, in addition alkyl, in particular $C_1$–$C_6$-alkyl, such as —$CH_3$, —$C_2H_5$, —$C_3H_7$ or —$C_4H_9$, or cycloalkyl, preferably cyclohexyl; $R_3''$ designates alkyl, in particular $C_1$–$C_{18}$-alkyl, which can be substituted, for example by —OH, —Cl, —Br, —SH, $C_1$–$C_6$-alkoxy, hydroxy-$C_1$–$C_6$-alkoxy, phenoxy, $C_1$–$C_4$-alkylphenoxy, chlorophenoxy, bromophenoxy, nitrophenoxy or $C_1$–$C_6$-alkoxyphenoxy; cycloalkyl, in particular cyclopentyl or cyclohexyl, aralkyl, in particular phenyl-$C_1$–$C_4$-alkyl, which, in the phenyl ring, can be substituted, for example by $C_1$–$C_6$-alkyl, halogen, such as chlorine, bromine or fluorine, nitro or $C_1$–$C_6$-alkoxy; or aryl, in particular phenyl or naphthyl which can be substituted, for example by $C_1$–$C_6$-alkyl, $C_1$–$C_6$-alkoxy or $C_1$–$C_6$-alkylthio.

Examples of $R_3''$ are methyl, ethyl, n-propyl, i-propyl, n-butyl, i-butyl, n-pentyl, n-hexyl, n-heptyl, n-octyl, n-β-ethylhexyl, n-nonyl, n-decyl, n-undecyl, n-dodecyl, n-hexadecyl, n-octadecyl, β-hydroxyethyl, γ-hydroxy-n-propyl, δ-hydroxy-n-butyl, β-chloroethyl, β-bromoethyl, β-mercaptoethyl, β-methoxyethyl, β-ethoxyethyl, β-propoxyethyl, β-butoxyethyl, γ-methoxy-n-propyl, δ-methoxy-n-butyl, β-(β-hydroxyethoxy)-ethyl, β-phenylethyl, β-(4-methylphenyl-ethyl, β-(4-ethylphenyl)-ethyl, β-(4-butylphenyl)-ethyl, β-(2-methylphenyl)-ethyl, β-(2,4-dimethylphenyl)-ethyl, β-(2,4,6-trimethylphenyl)-ethyl, β-(4-chlorophenyl)-ethyl, β-(4-nitrophenyl)-ethyl, β-(4-methoxyphenyl)-ethyl, β-phenoxyethyl, β-(4-methylphenoxy)-ethyl, β-(4-butylphenoxy)-ethyl, β-(2-methylphenoxy)-ethyl, β-(2,4-dimethylphenoxy)-ethyl, β-(4-chlorophenoxy)-ethyl, β-(4-nitrophenoxy)-ethyl, β-(4-methoxyphenoxy)-ethyl, phenyl, 4-pentylphenyl and 4-butoxyphenyl.

Dyestuffs which are particularly highly suitable for use in liquid-crystalline materials have the formula

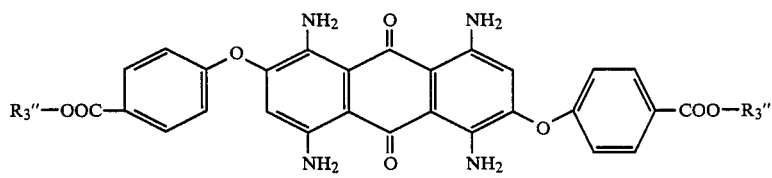

in which
$R_3''$ has the meaning mentioned for the formula IV.

Compounds which are also highly suitable for use in liquid-crystalline materials have the formulae in which
Q'' represents —$SR_3$, —$SO_2R_3$, —$SO_3R_3$, —SC(O)$R_3$, —COS$R_3$, —O—SO—$R_3$, —COO$R_3$, —OC(O)$R_3$, —CH=N$R_3$, —$R_3$, —O$R_3$, —NHCO—NH$R_3$ or —OCONH$R_3$, M'' represents hydrogen, halogen, in particular bromine, —$SO_3R_3$, —O$R_3$, —O—$CH_2CH_2$—O$R_3$ or —OSO$_2R_3$ and X, $R_1$ and $R_3$ have the meaning indicated for the formula I.

Examples of dyestuffs of the formulae VIa and VIb and which carry, as Q'', a sulphonate group —$SO_3R_3$ are aralkyl sulphonates and aryl sulphonates, with $R_3$ having the meaning indicated in the formula I. $R_3$ can denote, for example, phenyl, 4-methylphenyl, 4-ethylphenyl, 4-methoxyphenyl, 4-chlorophenyl, 2-chlorophenyl, 3-chlorophenyl, 4-bromophenyl, 2,4-dimethylphenyl, 2,4,6-trimethylphenyl, 4-methylmercaptophenyl, 4-tert.-butylphenyl, 4-carbomethoxyphenyl, 4-acetylaminophenyl, benzyl or phenethyl.

In dyestuffs of the formula VIa and VIb and which carry, as Q'', an azomethine group —CH=N—$R_3$, $R_3$ denotes, for example, methyl, ethyl, butyl, phenyl, 4-methylphenyl, 4-methoxyphenyl, 4-aminophenylphenyl, 3-thiacyclopentenyl, 2-benzothaizolyl, 3-trifluoromethylphenyl, 4-cyclohexylphenyl or 4-chlorophenyl.

Examples of dyestuffs of the formula VI and which carry, as Q'', a group —O$R_3$, —O—CH—$R_3$ or —O—$CH_2$—$CH_2$—O$R_3$ are those in which $R_3$ denotes phenyl, 4-methylphenyl, 4-chlorophenyl, 2-methylphenyl, 4-nitrophenyl, 4-sulphophenyl, 4-methoxyphenyl, 4-trifluoromethylphenyl, 4-tert.-butylphenyl or 2-chlorophenyl.

Compounds which are particularly suitable for use in liquid-crystalline materials have the formula

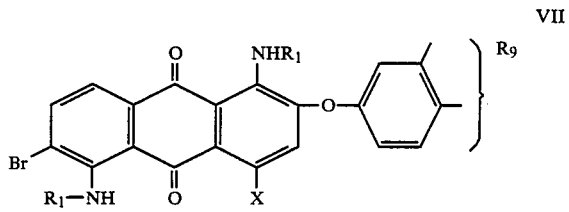
VII

In the formula VII, X and $R_1$ have the meaning indicated in the formula I, while $R_9$ can represent $R_6$ in the meaning mentioned for the formula I or a cycloalkyl group, in particular a $C_3$–$C_7$-cycloalkyl group.

The new anthraquinone dyestuffs are prepared in a way which is in itself known.

The compounds of the formula III, IV or V can be prepared via 1,4,5,8-tetraamino-2,6-dibromoanthraquinone, which has been described in the literature, by reaction with suitable nucleophiles. The 1,4,5- and 1,4,8-triamino compounds can be prepared from 1-amino-5- and -8-chloroanthraquinone respectively by bromination and subsequent tosylamide fusion.

After the replacement of the bromine atoms in the β-position, the tosylate radical is cleaved, and the final product is obtained. As a rule, the compounds are obtained in inadequate purity, so that additional measures, such as column chromatography or liquid-liquid partition, are necessary.

To prepare the compounds of the formulae IIa and IVa, 1-amino-4-tosylamino-5-acetylaminoanthraquinone-2-sulphonic acid can be used. After reaction with an alcoholate or another nucleophile, 1,5-diamino-4-tosylaminoanthraquinone having a subsituted 2-position is obtained. On splitting off the tosylate radical with acids, for example phosphoric acid, 1,4,5-triaminoanthraquinone having a substituted 2-position is obtained. Alternatively, it is possible to start from 1-amino-2-bromo-5-nitro-4-tosylaminoanthraquinone. After reduction of the nitro group and replacement of the bromine atom by alcoholate, the tosylate radical is split off under acid conditions using sulphuric or phosphoric acid. To prepare 1,5-diamino-4-hydroxyanthraquinone having a substituted 2-position, it is possible to start from, for example, 1-amino-4-bromo-5-acetylaminoanthraquinone-2-sulphonic acid, replace the bromine atom in the 4-position in a known way by OH and then proceed as described above. Alternatively, it is possible to start from 1-amino-2-bromo-4-hydroxy-5- or -8-chloroanthraquinone. The chlorine atom is first replaced using the tosylamide fusion and isomeric 5- or 8-tosylate respectively is obtained. Bromine replacement in the 2-position and cleavage of the tosylate group are effected by procedures described in the literature.

1,4,8-Triamino-2-substituted anthraquinone is obtained from 1-amino-4,8-ditosylamino-2-bromoanthraquinone. After reaction with an alcoholate or a nucleophile of suitable reactivity, the desired product is obtained after the tosylate cleavage, for example by means of phosphoric acid or sulphuric acid. 1,4,5-Triamino-2-substituted anthraquinones are obtained in a completely corresponding manner from 1-amino-4,5-ditosylamino-2-bromoanthraquinone. 1,8-Diamino-4-hydroxy-3-substituted antraquinones can be obtained, for example from 1-amino-4-bromo-5-acetylaminoanthraquinone-2-sulphonic acid, by diazotising the 1-amino group, decomposing, by boiling, the resulting diazonium group, tosylamide fusion, replacement of the sulpho group by an alcoholate and tosylate cleavage. The yields are moderate, and the products must be purified by chromatography.

Deserving of particular interest within the scope of this invention are liquid-crystalline materials containing anthraquinone dyestuffs of the formula

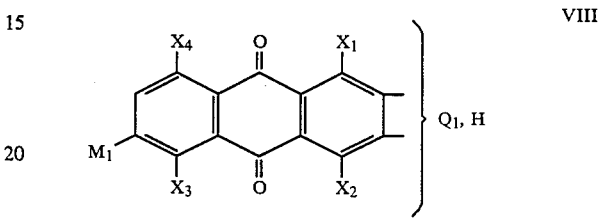
VIII in which
$X_1$ designates —$NH_2$ or —$NHCH_3$,
$X_2$ designates —$NH_2$, —$NHCH_3$ or —OH,
$X_3$ and $X_4$ designate —H, —$NH_2$ or —$NHCH_3$,
$M_1$ designates —H or —$Q_1$ and
$Q_1$ represents a radical

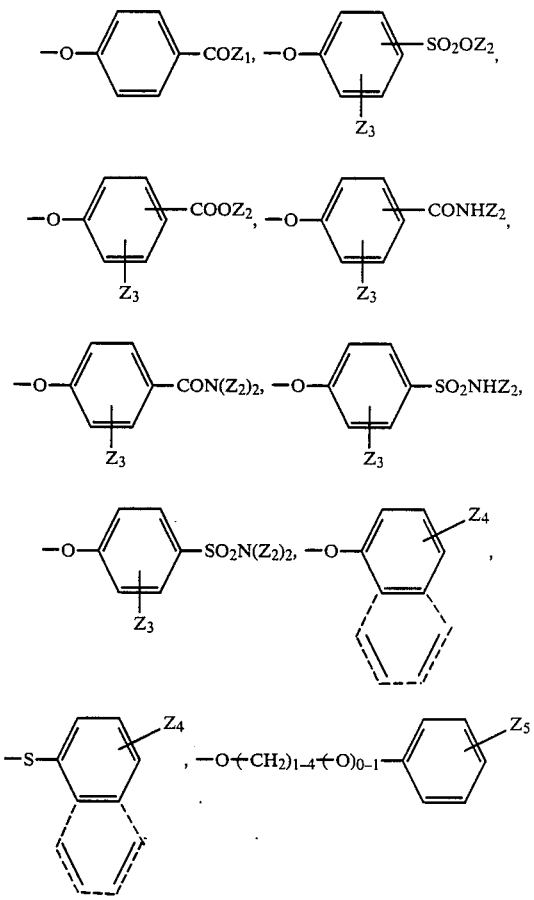

or —O—$Z_6$, with the substituents having the following meanings:

$Z_1$ = $C_1$–$C_{12}$-alkoxy which can be substituted by $C_1$–$C_6$-alkoxy, $C_1$–$C_6$-alkylthio, amino, mono-($C_1$–$C_6$-alkyl)-amino, or di-($C_1$–$C_6$-alkyl)-amino; $C_1$–$C_{12}$-alkylthio or cyclohexyloxy which can be substituted by $C_1$–$C_6$-alkyl;

$Z_2$ = phenyl which can be substituted by $C_1$–$C_6$-alkoxy or $C_1$–$C_6$-alkyl; $C_1$–$C_6$-alkyl, phenyl-$C_1$–$C_4$-alkyl which can be substituted in the phenyl radical by $C_1$–$C_4$-alkoxy; or cyclohexyl;

$Z_3$ = —H, —Cl or —Br;

$Z_4$ and $Z_5$ = $C_1$–$C_6$-alkyl, —H, —Cl, —Br, $C_1$–$C_6$-alkoxy, $C_1$–$C_6$-alkylthio, phenyl, sulphamoyl, —$CF_3$ or $C_1$–$C_8$-alkyl, and $Z_6$ = $C_1$–$C_8$-alkyl which can be substituted by $C_1$–$C_6$-alkoxy or phenoxy.

EXAMPLES:

EXAMPLE 1a 60 g of n-pentyl 4-hydroxybenzoate and 15 g of potassium carbonate are heated in a slow nitrogen stream at 140°–145° C. until dry, 30 g of 1,5-diamino-2,6-dibromo-4,8-di-(p-tosylamino)-anthraquinone are added, and the mixture is stirred for 16 hours at 160°–170° C. After cooling down to 70° C., the melt is stirred into methanol, the precipitated blue dyestuff is filtered off with suction and washed with methanol and water, and, after drying, 31 g=76.8% of theory of 1,5-diamino-2,6-di-(4-pentyloxycarbonylphenoxy)-4,8-di-(p-tosylamino)-anthraquinone are obtained.

EXAMPLE 1b 10 g of the dyestuff mentioned in Example 1a are stirred for 1 hour at 30° C. in 50 ml of concentrated sulphuric acid and then slowly diluted with 50 ml of water at 15°–20° C. The dyestuff sulphate which has crystallised out in the form of prisms is filtered off with suction and washed with dilute sulphuric acid and stirred at 90° C. in water with the addition of ammonia. After filtering with suction and drying, 5.5 g=80% of theory of 1,4,5,8-tetraamino-2,6-di-(4-pentyloxycarbonylphenoxy)anthraquinone are obtained which, on purification from, for example, o-dichlorobenzene, have an order parameter S of 0.82 in a nematic phase consisting of a mixture of about 24% of trans-4-heptyl-(4-cyanophenyl)-cyclohexane, 37% of trans-4-pentyl-(4-cyanophenyl)-cyclohexane, 26% of trans-4-propyl-(4-cyanophenyl)-cyclohexane and 12% of trans-4-pentyl-(4'-cyanobiphenylyl)-cyclohexane. If corresponding esters are used instead of n-pentyl 4-hydroxybenzoate in Example 1a, the dyestuffs indicated in Table 1 are obtained analogously to Example 1b:

TABLE 1

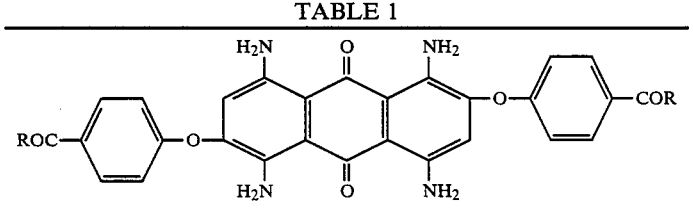

| Example | R | Order parameter S |
|---|---|---|
| 2 | $CH_3$—O— | 0.78 |
| 3 | $C_2H_5$—O— | 0.76 |
| 4 | n-$C_3H_7$—O— | 0.76 |
| 5 | i-$C_3H_7$—O— | 0.74 |
| 6 | n-$C_4H_9$—O— | 0.76 |
| 7 | i-$C_4H_9$—O— | 0.73 |
| 8 | ($CH_3$)$_2$CH—$CH_2$—$CH_2$—O— | 0.72 |
| 9 | $C_4H_9$—S— | 0.78 |
| 10 | $CH_3$—($CH_2$)$_4$—$CH_2$—O— | 0.78 |
| 11 | $CH_3$—$CH_2$—CH($C_2H_5$)—$CH_2$—O— | 0.79 |
| 12 | $CH_2$—($CH_2$)$_3$—CH($C_2H_5$)—$CH_2$—O— | 0.74 |
| 13 | $CH_3$—($CH_2$)$_7$—$CH_2$—O— | 0.74 |
| 14 | $CH_3$—($CH_2$)$_{10}$—$CH_2$—O— | 0.72 |
| 15 | $CH_3$—($CH_2$)$_{10}$—$CH_2$—S— | 0.72 |
| 16 | cyclohexyl-O— | 0.73 |

TABLE 1-continued
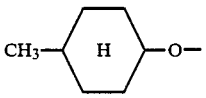
| Example | R | Order parameter S |
|---|---|---|
| 17 | 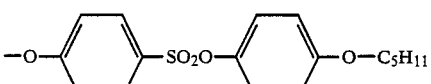 | 0.73 |
| 18 | CH$_3$—O—CH$_2$—CH$_2$—O— | 0.71 |
| 19 | CH$_3$—S—CH$_2$—CH$_2$—O— | 0.70 |
| 20 | CH$_3$—CH$_2$—CH$_2$—O—CH$_2$—CH$_2$—O— | 0.70 |
| 21 | CH$_3$—(CH$_2$)$_3$—O—CH$_2$—CH$_2$—O—CH$_2$—CH$_2$—O— | 0.67 |
| 22 | C$_2$H$_5$—S—CH$_2$—CH$_2$—O— | 0.68 |
| 23 | (CH$_3$)$_2$N—CH$_2$—CH$_2$—O— | 0.69 |
| 24 | 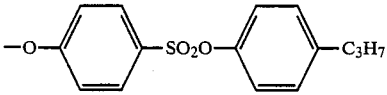 | 0.76 |
| 25 | 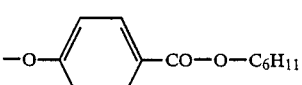 | 0.75 |
| 26 | 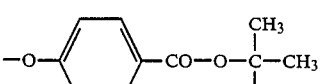 | 0.73 |
| 27 | 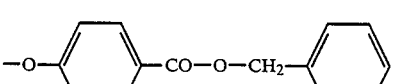 | 0.72 |
| 28 | 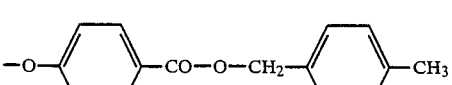 | 0.75 |
| 29 | 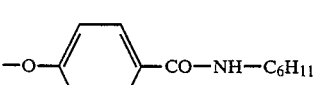 | 0.75 |
| 30 | 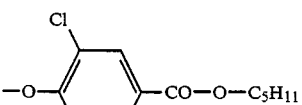 | 0.71 |
| 31 | 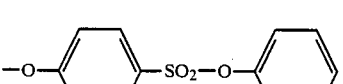 | 0.79 |
| 32 |  | 0.78 |

TABLE 1-continued

[Structure: anthraquinone with H2N at 1,5 positions, NH2 at 4,8 positions, and ROC-C6H4-O- groups at 2,6 positions]

| Example | R | Order parameter S |
|---|---|---|
| 33 | −C(=O)−C6H4−SO2−N(CH3)2 | 0.70 |
| 34 | −O−C6H4−SO2−N(H)−CH2−CH2−OCH3 | 0.69 |
| 35 | −O−C6H4(COOCH3) | 0.74 |
| 36 | −O−C6H4(COO(CH2)4−CH3) | 0.75 |
| 37 | −O−C6H4(COO−CH2−CH2−OCH3) | 0.70 |
| 38 | −O−C6H4(CO−N(C2H5)2) | 0.68 |
| 39 | −O−C6H4(COOC6H11) | 0.73 |

EXAMPLE 40a 7 g of 1-amino-2-bromo-5-nitro-4-(p-tosylamino)-anthraquinone in 100 ml of water and 20 ml of a 30% strength sodium hydrogen sulphide solution are heated in the course of 1 hour to 90°–95° C. and stirred until the reduction is complete. The product, which has crystallised in red-tinged blue needles, is filtered off hot with suction and washed with water, and, after drying, 5.5 g=83.5% of theory of 1,5-diamino-2-bromo-4-(p-tosylamino)-anthraquinone are obtained.

EXAMPLE 40b 64 g of phenol and 6 g of potassium carbonate are heated until dry by distilling off phenol, and, at 120°–130° C. 8 g of 1,5-diamino-2-bromo-4-(p-tosylamino)-anthraquinone are added. The mixture is stirred at 160°–170° C. until the formation of the new dyestuffs is complete, according to a thin layer chromatogram, and the product is precipitated by the dropwise addition of methanol at 70° C. The dyestuff, which is crystallised in blue-violet prisms, is filtered off with suction and washed with methanol and water, and, after drying, 6.2 g=75.5% of theory of 1,5-diamino-2-phenoxy-4-(p-tosylamino)-anthraquinone are obtained.

EXAMPLE 40c 10 g of the dyestuff mentioned in Example 40b are stirred for 1 hour at 30° C. in 50 ml of concentrated sulphuric acid and then slowly diluted with 50 ml of water at 15°-20° C. The dyestuff sulphate which has crystallised out in the form of prisms is filtered off with suction and washed with dilute sulphuric acid and stirred at 90° C. in water the addition of ammonia. After filtering with suction and drying, 5 g=72.4% of theory of 1,4,5-triamino-2-phenoxyanthraquinone, which, after, chromatographic purification, has an order parameter of 0.74, are obtained. Using analogous methods and using correspondingly substituted phenols or thiophenols, produces the dyestuffs indicated in Table 2 below:

TABLE 2

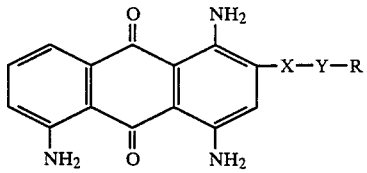

| Example | $R_1$ | X | Y | R | S |
|---|---|---|---|---|---|
| 41 | H | O | phenylene | 4-methyl | 0.73 |
| 42 | H | O | phenylene | 4-ethyl | 0.74 |
| 43 | H | O | phenylene | 2-chloro | 0.75 |
| 44 | H | O | phenylene | 4-methylmercapto | 0.75 |
| 45 | H | S | phenylene | 4-methoxy | 0.68 |
| 46 | $CH_3$ | O | phenylene | 3-methoxy | 0.66 |
| 47 | H | O | phenylene-4-carbonyloxy | n-pentyl | 0.73 |
| 48 | H | O | phenylene | 3-chloro | 0.77 |
| 49 | H | S | phenylene | 4-tert.-butyl | 0.65 |
| 50 | H | S | phenylene | 4-chloro | 0.69 |
| 51 | H | O | phenylene | 2-ethoxy | 0.74 |
| 52 | $CH_3$ | O | phenylene | 4-chloro | 0.66 |
| 53 | H | O | phenylene-3-carbonyloxy | n-pentyl | 0.72 |
| 54 | H | O | phenylene-4-sulphonyloxy | phenyl | 0.73 |
| 55 | H | O | phenylene | 4-sulphonamido | 0.69 |

EXAMPLE 56a 23 g of 1-amino-4-bromo-5-acetylaminoanthraquinone-2-sulphonic acid as the Na salt, 15 g of p-toluenesulphonamide, 7 g of anhydrous Na carbonate and 0.5 g of Cu sulphate are added to 300 ml of water. The mixture is heated under reflux until the starting product has been almost completely converted after about 4 hours. After cooling down, the product is filtered off with suction and washed with cold water until as salt-free as possible. After drying at 60° C., 24.1 g of crystals are obtained.

EXAMPLE 56b 6 g of 1-amino-4-(4-toluenesulphamido)-5-acetylaminoanthraquinone-2-sulphonic acid, prepared according to Example 56a, are added at 80° C. to 30 g of KOH dissolved in 87 ml of glycol monomethyl ether. The temperature is maintained until the starting product has disappeared, the mixture is allowed to cool down, and the product is filtered off with suction, washed with water and dried at 60° C. Yield: 3.6 g.

EXAMPLE 56c 2 g of the product of Example 56b are heated together with 30 g of crystalline orthophosphoric acid at 130° C. until the starting material has been consumed. The reaction solution is stirred into 500 ml of water to which 5 g of NaCl have been added. The precipitated dyestuff is filtered off with suction, washed until neutral and dried. Yield: 1.15 g. Dissolved in the TLC 1132 (Messrs. Merck) phase, this dyestuff has an order parameter of 0.70 after chromatographic purification. In other phases having positive dielectric anisotropy and a mesophase range of −20°−+80° C., similarly good order parameters are found.

The dyestuffs listed in Table 3 below can be prepared analogously to Examples 56a-c:

TABLE 3

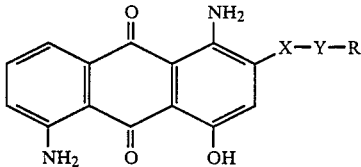

| Example | X | Y | R | S |
|---|---|---|---|---|
| 57 | O | —$CH_2$—phenylene | 4-chloro | 0.73 |
| 58 | S | —$CH_2$—phenylene | H | 0.70 |
| 59 | O | —$CH_2$—phenylene | 4-methyl | 0.72 |
| 60 | O | —$(CH_2)_2$—phenylene | H | 0.74 |
| 61 | O | —$(CH_2)_2$—phenylene | 4-methoxy | 0.75 |
| 62 | O | —$(CH_2)_2$—O—phenylene | H | 0.63 |
| 63 | O | —$(CH_2)_2$—O—phenylene | 4-methoxy | 0.66 |
| 64 | O | —$(CH_2)_2$—O—phenylene | 3-methyl | 0.65 |
| 65 | O | —$(CH_2)_4$—O—phenylene | H | 0.68 |
| 66 | O | —$CH_2$— | H | 0.70 |
| 67 | O | —$(CH_2)_2$— | H | 0.70 |
| 68 | O | —$(CH_2)_5$— | H | 0.69 |
| 69 | O | —$(CH_2)_2$—O—$CH_2$— | H | 0.68 |
| 70 | S | —$(CH_2)_4$— | H | 0.67 |

If Example 56b is followed, but, in the starting material of Example 56a, the bromine atom in the 4-position is first replaced by an OH group analogously to the instructions given in German Offenlegungsschrift No. 1,064,173, which, at the same time, eliminates the acetyl group, then the following compounds are obtained:

TABLE 4

| Examples | X | Y | R | S |
|---|---|---|---|---|
| 71 | O | phenylene | H | 0.72 |
| 72 | O | phenylene | 4-methyl | 0.71 |
| 73 | O | phenylene | 3-methoxy | 0.69 |
| 74 | O | phenylene | 4-butoxy | 0.71 |
| 75 | O | phenylene-4-sulphonyloxy | phenyl | 0.69 |
| 76 | S | phenylene | 4-methyl | 0.65 |
| 77 | S | phenylene | 4-tert.-butyl | 0.65 |
| 78 | O | —$CH_2$—phenylene | H | 0.66 |
| 79 | O | —$(CH_2)_2$—phenylene | H | 0.65 |
| 80 | O | —$CH_2$— | H | 0.68 |
| 81 | O | —$(CH_2)_4$ | H | 0.70 |
| 82 | S | —$(CH_2)_3$— | H | 0.65 |
| 83 | O | phenylene | 3-chloro | 0.72 |

Example 56a to c is followed and 1-hydroxy-4-bromo-5-acetylaminoanthraquinone- or -5-aminoanthraquinone-2-sulphonic acid, either of which can be prepared from the 1-amino compound analogously to German Patent Specification No. 518,214, by diazotisation and boiling to decompose the resulting diazonium group, is used as starting substance. The following compounds are obtained:

TABLE 5

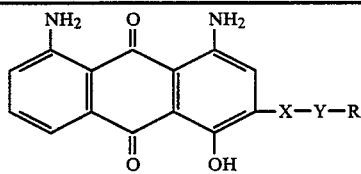

| Example | X | Y | R | S |
|---|---|---|---|---|
| 84 | O | phenylene | H | 0.70 |
| 85 | O | phenylene | 4-OCH$_3$ | 0.71 |
| 86 | O | phenylene | 3-Cl | 0.73 |
| 87 | O | —CH$_2$—phenylene | H | 0.69 |
| 88 | O | —CH$_2$— | H | 0.68 |
| 89 | O | —(CH$_2$)$_5$— | H | 0.70 |
| 90 | S | phenylene | 4-chloro | 0.66 |

EXAMPLE 91a 20.8 g of 1-amino-8-chloro-2,4-dibromoanthraquinone in 180 ml of o-dichlorobenzene are heated together with 22.8 g of p-toluenesulphonamide and 11.2 g of K acetate in the presence of 0.1 g of Cu(II) acetate under reflux until the starting product has almost completely disappeared. The process of the reaction is monitored by thin layer chromatography. The product is filtered off cold with suction, washed first with methanol and then with hot water and dried. Yield: 8.9 g.

EXAMPLE 91b 32 g of the product of Example 91a in 100 ml of N-methylpyrrolidone are heated with stirring together with 10.4 g of K carbonate and 37.6 g of phenol at 130° C. until the starting material has disappeared. After cooling down to about 80° C., 100 ml of methanol are added and the product is filtered off cold with suction and washed first with methanol and then with water. Yield: 26.2 g.

EXAMPLE 91c

To split the toluenesulphonamide, 6.5 g of the product of Example 91b are added at 50° C. to 65 g of orthophosphoric acid, and the reaction is completed at 130° C. The mixture is then discharged onto water, and the product is filtered off with suction, washed until neutral and dried. Yield: 2.75 g of 1,4,8-triamino-2-phenoxyanthraquinone.

Using other phenols or nucleophiles, the compounds listed in Table 6 are obtained in a completely corresponding manner.

TABLE 6

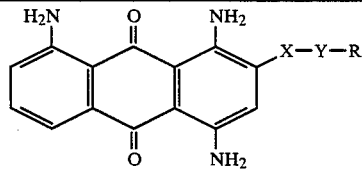

| Example | X | Y | R | S |
|---|---|---|---|---|
| 92 | O | phenylene | 2-chloro | 0.75 |
| 93 | O | phenylene | 3-chloro | 0.78 |
| 94 | O | phenylene | 4-chloro | 0.74 |
| 95 | O | phenylene | 3-CF$_3$ | 0.73 |
| 96 | O | phenylene | 2-methyl | 0.74 |
| 97 | O | phenylene | 3-methyl | 0.76 |
| 98 | O | phenylene | 4-methyl | 0.73 |
| 99 | O | phenylene | 4-n-pentyl | 0.74 |
| 100 | O | phenylene | 2-methoxy | 0.73 |

TABLE 6-continued

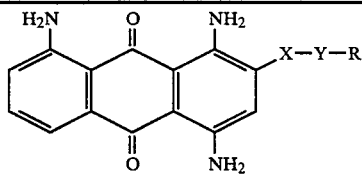

| Example | X | Y | R | S |
|---|---|---|---|---|
| 101 | O | phenylene | 4-ethoxy | 0.76 |
| 102 | O | phenylene | 4-heptyloxy | 0.75 |
| 103 | O | phenylene | 4-methylmercapto | 0.75 |
| 104 | O | phenylene | 4-cyclohexyl | 0.71 |
| 105 | O | naphthylene | H | 0.75 |
| 106 | O | phenylene-4-carbonyloxy | n-pentyl | 0.73 |
| 107 | O | phenylene-4-carbonyloxy | methyl | 0.74 |
| 108 | O | phenylene-3-carbonyloxy | methyl | 0.73 |
| 109 | O | phenylene-4-sulphonyloxy | phenyl | 0.73 |
| 110 | S | phenylene | H | 0.68 |
| 111 | O | —CH$_2$— | H | 0.69 |
| 112 | O | —(CH$_2$)$_5$— | H | 0.70 |
| 113 | O | —CH$_2$—phenylene | H | 0.68 |
| 114 | O | —(CH$_2$)$_2$—phenylene | H | 0.70 |

EXAMPLE 115

35.3 g of 1-amino-2-bromo-8-chloro-4-hydroxyanthraquinone, prepared from 1-amino-2,4-dibromo-8-chloroanthraquinone by treatment with boric acid and sulphuric acid analogously to German Offenlegungsschrift No. 1,064,173, 22.8 g of 4-toluenesulphonamide and 11.5 g of K acetate are boiled under reflux in 350 ml of amyl alcohol in the presence of 0.3 g of Cu acetate until conversion is complete. THe product is filtered off cold with suction, washed with methanol and hot water and dried. Yield: 43.4 g.

24.4 g of the compound thus prepared are heated together with 18.4 g of phenol and 5.2 g of K acetate in 50 ml of N-methylpyrrolidone at 120° C. for some hours until conversion is complete. The mixture is then diluted with 50 ml of methanol, the entire batch is allowed to cool down, and the product is filtered off with suction and washed with methanol and then with hot water. After drying, 20.3 g of 1-amino-2-phenoxy-4-hydroxy-8-toluenesulphonamidoanthraquinone are obtained. 5 g thereof are added at about 50° C. to 65 g of orthophosphoric acid, and the mixture is heated to 130° C. After cleavage is complete, the batch is discharged onto 160 ml of water, and the product is filtered off with suction and washed until neutral. Yield: 3.1 g.

If other substituted phenols or thiophenols are used instead of phenol, the following compounds are obtained in an analogous manner.

TABLE 7

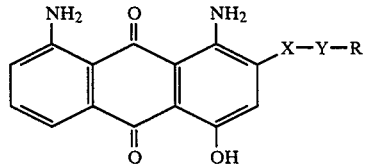

| Example | X | Y | R | S |
|---|---|---|---|---|
| 116 | O | phenylene | 2-chloro | 0.70 |
| 117 | O | phenylene | 4-chloro | 0.69 |

TABLE 7-continued

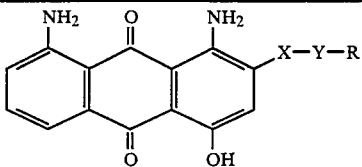

| Example | X | Y | R | S |
|---|---|---|---|---|
| 118 | O | phenylene | 3-chloro | 0.71 |
| 119 | O | phenylene | 4-methyl | 0.68 |
| 120 | O | phenylene | 4-heptyloxy | 0.70 |
| 121 | O | phenylene | 4-methoxy | 0.71 |
| 122 | O | phenylene | 3-butoxy | 0.71 |
| 123 | O | phenylene-4-carbonyloxy | methyl | 0.69 |
| 124 | O | phenylene-4-carbonyloxy | n-pentyl | 0.68 |
| 125 | O | —$CH_2$—phenylene | H | 0.63 |
| 126 | O | —$(CH_2)_2$—phenylene | H | 0.65 |
| 127 | S | phenylene | H | 0.63 |
| 128 | S | phenylene | 4-tert.-butyl | 0.64 |

EXAMPLE 129

15 g of 1,5-diaminoanthraquinone are stirred together with 35 g of bromine in 400 ml of dilute hydrochloric acid at room temperature. The precipitate is filtered off with suction and washed with a large amount of water, and 29 g of mixed isomers are obtained. This mixture is converted via a tosylamide fusion into a mixture of predominantly tetraamino-2-bromo- and -2,8-dibromoanthraquinone. The replacement of bromine by p-chlorophenolate leads to a dyestuff mixture from which the tetraamino-2,6-disubstituted products can be separated as a residue sparingly soluble in methylene chloride. The soluble proportion is chromatographed.

0.8 g of triaminobromo-(4-chlorophenoxy)-anthraquinone, which is contaminated with less triamino-(4-chlorophenoxy)-anthraquinone, is obtained. The order parameter, in TLC 1132, is 0.80.

Similarly good order parameters are found in other phases having positive dielectric anisotropy and a mesophase range of −20°−+80° C.

The analogous dyestuffs listed in Table 8 and which are identical with the corresponding dyestuffs prepared according to Example 40c are obtained from 1-amino-5-chloro-2,4-dibromoanthraquinone in a completely corresponding manner, as described in Example 91:

TABLE 8

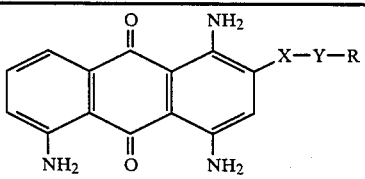

| Example | X | Y | R | S |
|---|---|---|---|---|
| 130 | O | phenylene | H | 0.71 |
| 131 | O | " | 3-chloro | 0.74 |
| 132 | O | " | 4-chloro | 0.71 |
| 133 | O | " | 2-methyl | 0.71 |
| 134 | O | " | 4-methyl | 0.70 |
| 135 | S | " | H | 0.64 |
| 136 | O | " | 4-n-pentyl | 0.72 |
| 137 | O | " | 4-ethoxy | 0.73 |
| 138 | O | " | 4-n-heptyloxy | 0.73 |
| 139 | O | phenylene-4-carbonyloxy | n-pentyl | 0.72 |
| 140 | O | phenylene-4-sulphonyloxy | phenyl | 0.70 |

TABLE 8-continued

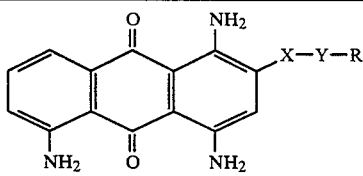

| Example | X | Y | R | S |
|---|---|---|---|---|
| 141 | O | 2-naphthylene | H | 0.70 |

EXAMPLE 142a 12.5 g of the dyestuff of Example 91b is added to a mixture of 17.6 g of n-pentanol, 22.6 g of ε-caprolactam and 2.6 g of dry, finely ground potassium carbonate. While a slow $N_2$ stream is being passed over, the mixture is heated with stirring at 140° C. until the reaction is complete. The mixture is allowed to cool down, 70 cm³ of methanol are added at about 70° C., the product is filtered off with suction at room temperature and washed with methanol and water, and, after drying, 10 g of a red-violet product are obtained.

EXAMPLE 142b 10 g of the dyestuff of Example 142a, in 100 g of orthophosphoric acid, are split analogously to Example 91c. 6.5 g of a violet dyestuff are obtained which, in TLC 1132, has an order parameter S of 0.64. Similarly good order parameters are obtained in other phases having positive dielectric anisotropy and a mesophase range from −20° to +80° C.

If other (substituted) alcohols are used instead of n-pentanol, the compounds listed in Table 9 are obtained in an analogous manner:

TABLE 9

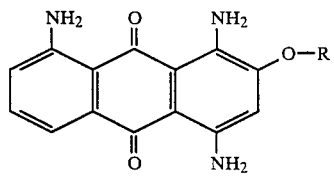

| Example | R | S |
|---|---|---|
| 143 | ethyl | 0.68 |
| 144 | n-propyl | 0.68 |
| 145 | phenyl | 0.71 |
| 146 | 2-chlorophenyl | 0.72 |
| 147 | 4-ethoxyphenyl | 0.73 |
| 148 | phenethyl | 0.71 |
| 149 | 2-phenoxyethyl | 0.62 |

The dyestuff of Examples 130 and 40c can also be trans-etherified with alcohols in a manner completely corresponding to that described in the above examples, and, after elimination of the tosyl radical, the analogous 1,4,5-triamino-2-alkoxyanthraquinones, which are identical to the corresponding dyestuffs prepared analogously to Example 56c, are obtained.

We claim:
1. A dyestuff of the formula

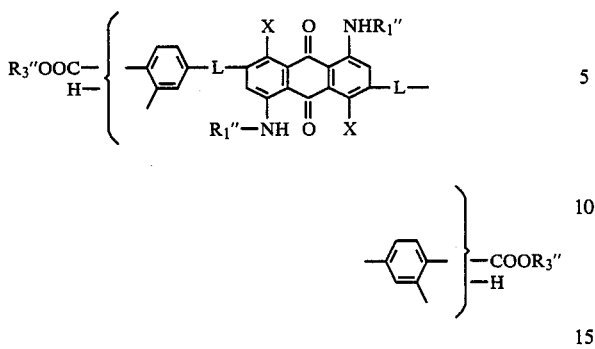

in which

L denotes an O or S atom or a group —NR$_1$—,

R$_1$ designates H, C$_1$–C$_8$-alkyl which can be substituted by C$_1$–C$_6$-alkoxy, C$_1$–C$_6$-alkylthio, phenoxy, phenylthio, Cl, Br, F, —NH$_2$, —SH, —OH or —CN, C$_3$–C$_7$cycloalkyl which can be substituted by C$_1$–C$_6$-alkyl, C$_1$–C$_6$-alkoxy, phenoxy, Cl, Br, F, —NH$_2$—, —SH, OH, or —CN, phenyl, naphthyl or biphenylyl which can be substituted by C$_1$–C$_6$-alkoxy, C$_1$–C$_6$-alkyl, phenoxy, F, Cl, Br, C$_1$–C$_6$-alkylthio, phenylthio or —OH, phenyl-C$_1$–C$_4$-alkyl which, in the phenyl radical, can be substituted by C$_1$–C$_6$-alkoxy, C$_1$–C$_6$-alkyl; phenoxy, F, Cl, Br, C$_1$–C$_6$-alkylthio, phenylthio or —OH, X designates —NHR$_2$, wherein R$_2$ designates H, C$_1$–C$_8$-alkyl which can be substituted by C$_1$–C$_6$-alkoxy, C$_1$–C$_6$-alkylthio, phenoxy, phenylthio, Cl, Br, F, —NH$_2$, —SCH, —OH or —CN, C$_3$–C$_7$ cycloalkyl which can be substituted by C$_1$–C$_6$-alkyl, C$_1$–C$_6$-alkoxy, phenoxy, Cl, Br, F, —NH$_2$, —SCH, —OH or —CN, Phenyl, naphthyl or biphenylyl, which can be substituted by C$_1$–C$_6$-alkoxy, C$_1$–C$_6$-alkyl, phenoxy, F, Cl, Br, C$_1$–C$_6$-alkylthio, or —OH, phenyl-C$_1$–C$_4$-alkyl which, in the phenyl radical, can be substituted by C$_1$–C$_6$-alkoxy, C$_1$–C$_6$-alkyl, phenoxy, F, Cl, Br, C$_1$–C$_6$-alkylthio, phenylthio or OH, R$_1''$ designates hydrogen, C$_1$–C$_6$-alkyl or cyclohexyl and R$_3''$ designates C$_1$–C$_{18}$-alkyl, which can be substituted by —OH, —Cl, Br—, —SH, C$_1$–C$_6$-alkoxy, hydroxy-C$_1$–C$_6$-alkoxy, phenoxy, C$_1$–C$_4$-alkylphenoxy, chlorophenoxy, bromophenoxy, nitrophenoxy or C$_1$–C$_6$-alkoxyphenoxy; cyclopentyl or cyclohexyl, phenyl-C$_1$–C$_4$-alkyl, which, in the phenyl ring, can be substituted by C$_1$–C$_6$-alkyl, Cl, Br, F, nitro or C$_1$–C$_6$-alkoxy; or phenyl or naphthyl which can be substituted by C$_1$–C$_6$-alkyl, C$_1$–C$_6$-alkoxy or C$_1$–C$_6$-alkylthio.

2. Dyestuff of the formula

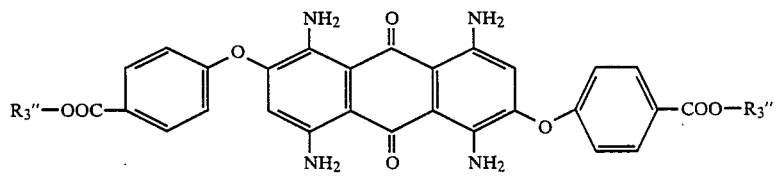

in which

R$_3''$ has the meaning indicated in claim 1.

3. Liquid-crystalline material containing at least one dyestuff according to claim 1.

4. Liquid-crystalline material according to claim 3, containing about 0.01 to about 30% by weight of at least one anthraquinone dyestuff.

5. Liquid-crystalline material according to claim 4 containing about 0.1 to 10% by weight of at least one anthraquinone dyestuff.

* * * * *

UNITED STATES PATENT AND TRADEMARK OFFICE
CERTIFICATE OF CORRECTION

PATENT NO. : 4,863,634

DATED : September 5, 1989

INVENTOR(S) : Uwe Claussen, et al

It is certified that error appears in the above-identified patent and that said Letters Patent is hereby corrected as shown below:

Title Page, Abstract, line 9    Delete "-$OR_2$," and substitute -- -$OR_3$,--

Col. 1, line 29    Delete "-NR" and substitute -- -NH --

Col. 1, line 55    Delete "-$NHR_1$-" and substitute -- -$NR_1$- --

Col. 3, line 57    Delete "properly" and substitute --property--

Col. 4, line 53    Delete "crystalline" and substitute --crystallise--.

Col. 6, line 62    Correct spelling of --benzothiazolyl--

Col. 18, line 37    Delete "THe" and substitute --The--

Col. 19, line 32    Delete "-2,8-" and substitute -- -2,6- --

Signed and Sealed this

Thirtieth Day of October, 1990

Attest:

HARRY F. MANBECK, JR.

*Attesting Officer*      *Commissioner of Patents and Trademarks*